US000001963H

(19) United States

(12) Statutory Invention Registration (10) Reg. No.: US H1963 H

Jones (43) Published: Jun. 5, 2001

(54) HIGH PRESSURE DIFFERENTIAL ELECTRICAL CONNECTOR

(75) Inventor: Dale A. Jones, Houston, TX (US)

(73) Assignee: Dresser Industries, Inc., Houston, TX (US)

(21) Appl. No.: 09/231,741

(22) Filed: Jan. 15, 1999

Related U.S. Application Data

(60) Provisional application No. 60/071,606, filed on Jan. 16, 1998.

(51) Int. Cl.[7] ..... H02G 15/02

(52) U.S. Cl. ..... 174/75 B

(58) Field of Search ..... 174/151, 74 R, 174/74 A, 75 B, 79, 110 R, 117 R; 333/24 R, 24 C, 260, 4, 245; 343/906, 870; 29/559

(56) References Cited

U.S. PATENT DOCUMENTS

| | | | | |
|---|---|---|---|---|
| 2,438,993 | * | 4/1948 | De Boer | 67/31 |
| 2,811,576 | * | 10/1957 | Hodgdon et al. | 174/167 |
| 3,994,552 | * | 11/1976 | Selvin | 339/49 B |
| 4,136,442 | * | 1/1979 | Harnett | 29/629 |
| 4,222,029 | * | 9/1980 | Marquis et al. | 340/52 R |
| 4,237,336 | * | 12/1980 | Kostjukov et al. | 174/151 |
| 5,203,723 | * | 4/1993 | Ritter | 439/589 |

* cited by examiner

*Primary Examiner*—Daniel T. Pihulic

(74) *Attorney, Agent, or Firm*—Cox & Smith Incorporated

(57) ABSTRACT

The present invention is directed to a downhole, high-current, low-impedance, feed-through connector for passing electrical current, preferably high frequency AC current, between a tool compartment having relatively high pressure and another tool compartment having relatively low pressure. The primary intended application of the present invention is to connect a radio frequency transmitter/receiver antenna to the antenna's tuning capacitors, but the present invention is applicable to any downhole application requiring the transmission of high electrical current across a barrier having a high pressure differential. This invention minimizes the force acting on the connector due to the high pressure differential by providing a conductor preferably having either a wave-like cross-section or a multi-finned cross-section, thereby minimizing the overall cross-sectional area of the connector yet providing sufficient cross-sectional area of the conductor to carry the necessary amount of electrical current.

74 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH PRESSURE DIFFERENTIAL ELECTRICAL CONNECTOR

This application claims priority from U.S. provisional application Ser. No. 60/071,606 filed Jan. 16, 1998.

BACKGROUND OF THE INVENTION

1. Field of the Invention

This invention relates generally to an apparatus for carrying electrical current in petroleum well drilling and logging tools. More specifically, this invention relates to a downhole apparatus for carrying high electrical current between a compartment having relatively high pressure and another compartment having relatively low pressure.

2. Description of the Related Art

Modern petroleum well drilling and logging tools frequently require the passage of electrical current between an area having relatively high pressure and another area having relatively low pressure. For example, in many pulsed nuclear magnetic resonance (NMR) measuring while drilling (MWD) tools, an antenna disposed generally on the periphery of the tool is used both to transmit radio frequency electromagnetic wave pulses into the surrounding earth formation and to receive NMR signals from the formation. In such tools, tuning capacitors are utilized in the antenna electronics (driving circuitry) to match the impedance of the antenna so that the antenna will resonate at the desired natural frequency. However, the tuning capacitors are sensitive items and require protection from the high pressures and temperatures of the harsh borehole environment.

Before the advent of tools such as that described in U.S. Pat. No. 5,557,201, issued to Kleinberg et al. on Sep. 17, 1996, that problem was solved by selecting capacitors with minimal pressure and temperature sensitivities and isolating the capacitors from the borehole fluids in an oil-filled compartment of the drill collar. The compartment seal separated the capacitor compartment from the borehole fluids, but the seal did not form a pressure seal and therefore the compartment realized the ambient borehole pressure. Consequently, the compartment was filled with oil to transmit the ambient pressure uniformly around the capacitors and thereby prevent the capacitors from being crushed by the high differential pressure. Moreover, because oil expands and contracts with changing temperature and pressure, those earlier devices had to include a means of varying the volume of the compartment to compensate for the temperature and pressure changes. Thus, such a scheme was very cumbersome.

Tools such as the '201 apparatus solved that problem by housing the antenna driving circuitry in a compartment that was not only sealed off from the borehole fluids but was also sealed off at constant atmospheric pressure. Thus, the compartment was simply filled with air instead of oil, and there was no need for a volume-regulation device. That method of protecting the capacitors made the manufacturing of the tool much simpler and less costly. However, because the pressure in the vicinity of the antenna (i.e., the borehole environment) is much higher than the pressure in the capacitor compartment, the apparatus for feeding the antenna into the capacitor compartment must withstand a severe pressure differential. For example, it is not uncommon for the borehole ambient pressure to be 1700 to 1900 times higher than standard atmospheric pressure. With such a high pressure differential, one would desire to minimize the area of the antenna feed-through apparatus to minimize the force acting on it. On the other hand, because certain NMR MWD tools require a very high electrical power in the antenna (for example, on the order of 10,000 watts at 600 volts and 16.7 amperes), the area of the feed-through apparatus must be large enough to accommodate a conductor of sufficient size to meet the high power requirement. Additionally, the feed-through area must be large enough to supply a sufficient gap between the two leads of the antenna loop.

Although several existing U.S. patents disclose various designs for carrying electrical current, none of the existing designs appears to be directed to solving the aforementioned problems. For example, U.S. Pat. No. 5,203,723, issued to Ritter on Apr. 20, 1993, discloses a pin-type electrical connector comprising one or more conductor pins disposed through a plastic body for use in high pressure and high temperature downhole environments. The '723 design is primarily directed to providing a hermetically sealed electrical connector between a relatively high pressure area and a relatively low pressure area and to improving connector performance and service life over a large number of elevated temperature and pressure cycles. However, the '723 design does not appear to be directed to providing a conductive path for very high electrical current through as small a cross-sectional area as possible.

Similarly, U.S. Pat. No. 4,237,336, issued to Kostjukov et al. on Dec. 2, 1980, discloses a thermocompensating electrical conductor for providing an electrical path between a dean zone and a contaminated zone, such as a nuclear reactor. The '336 conductor, which is preferably configured in the shape of a wave in the direction of electrical current flow and preferably comprises a stack of crimped metal strips, is primarily directed to improving thermal compensation and reducing electrodynamic loading when used for heavy electrical currents. Again, however, the '336 device does not appear to be directed to providing a conductive path for very high electrical current through as small a cross-sectional area as possible.

U.S. Pat. No. 4,222,029, issued to Marquis et al. on Sep. 9, 1980, discloses a vibration isolator having a sinuously configured, electrically conductive wire disposed within an elastomeric resilient member. Similar to the conductor of the '336 device, the wire of the '029 device has a wave-like shape in the direction of electrical current flow. The wave-like shape of the wire is directed to permitting linear extension of the wire in the direction of electrical current flow without breaking when the device is flexed by vibratory loads. However, the '029 device does not appear to be directed to providing a conductive path for very high electrical current through as small a cross-sectional area as possible, and the '029 device is not directed to accommodating a high pressure differential.

U.S. Pat. No. 3,994,552, issued to Selvin on Nov. 30, 1976, discloses a cylindrical metal electrical connector having a bellows configuration in the axial direction for connecting submersible pipes. The bellows configuration is directed to alleviating axial manufacturing tolerance problems. Once again, however, the '552 device is not directed to solving the need for a downhole electrical connector capable of carrying high electrical currents between a high pressure compartment and a low pressure compartment through as small a cross-sectional area as possible.

It would, therefore, be a significant advancement in the art to provide an improved downhole apparatus for supplying high electrical current between a compartment having relatively high pressure and another compartment having relatively low pressure through as small a cross-sectional area as possible.

SUMMARY OF THE INVENTION

Accordingly, this invention is directed to a downhole, high-current, low-impedance, feed-through connector for passing electrical current, preferably high frequency AC current, between a tool compartment having relatively high pressure and another tool compartment having relatively low pressure. Although the primary intended application of the present invention is to connect an antenna to the antenna's tuning capacitors in a downhole NMR MWD tool, persons reasonably skilled in the art of petroleum well drilling and logging will realize that the present invention is applicable to any downhole application requiring the transmission of high electrical current across a barrier having a high pressure differential. This invention solves the problem posed by the above-mentioned conflicting area requirements by providing a conductor with a corrugated or wave-like cross-section for the feed-through connector. The wave-like shape of the conductor provides sufficient cross-sectional area to carry a high current, yet the conductor requires much less feed-through area for the connector than that which would be required for a conventional conductor having a flat cross-sectional shape. Thus, this wave-like design minimizes the force on the feed-through connector while still accommodating the necessary current. Moreover, the wave-like design improves the bond between the conductor and the surrounding connector material by providing more bonding area. Alternatively, the same objectives may also be achieved by using a conductor having a cross-section with multiple fins.

BRIEF DESCRIPTION OF THE DRAWINGS

This invention may best be understood by reference to the following drawings.

DETAILED DESCRIPTION OF A PREFERRED EMBODIMENT

Figure 1:
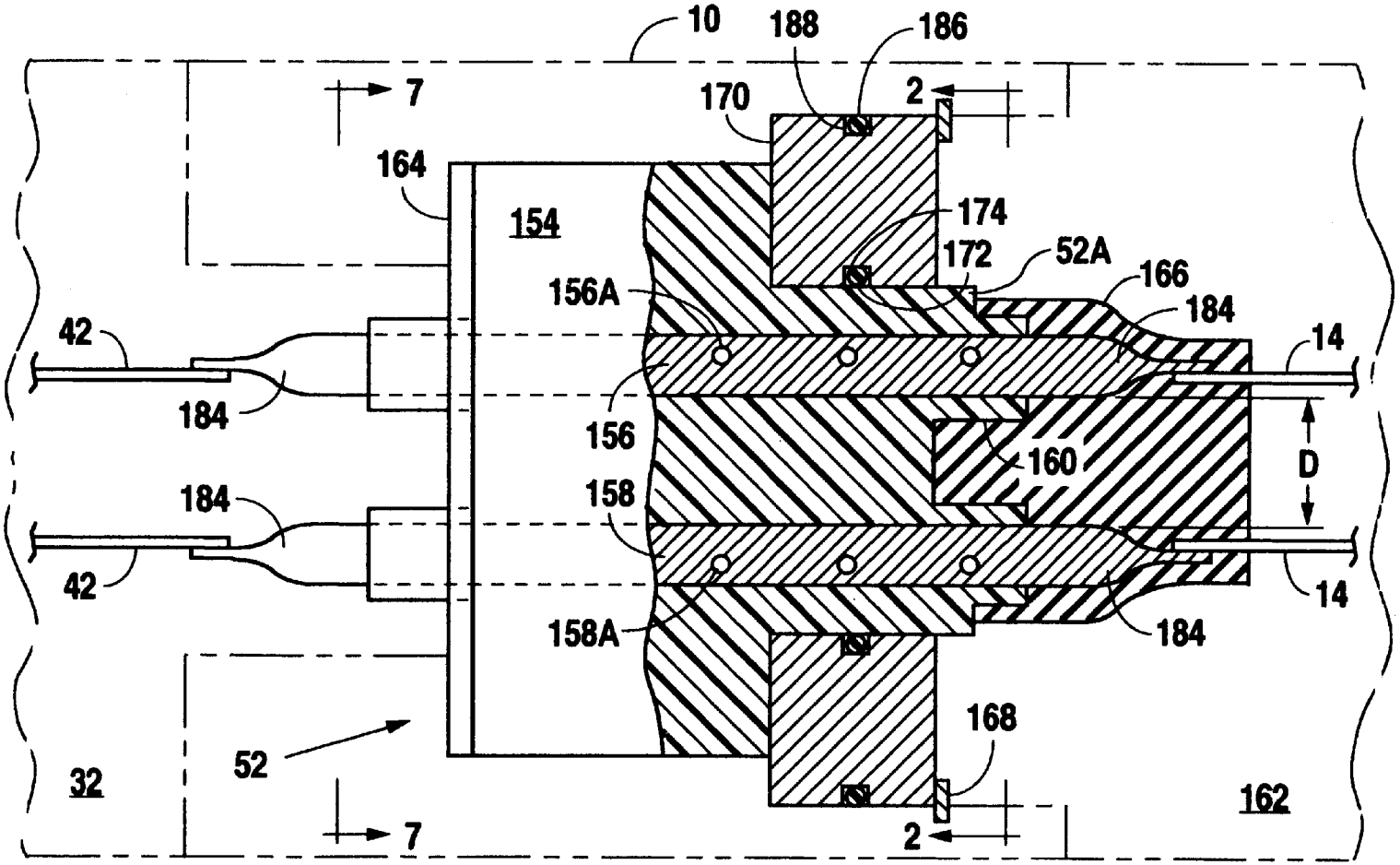
FIG. 1 is a schematic side elevational, partially cross-sectioned view of an electrical connector in accordance with the present invention.

FIG. 1 illustrates an electrical connector 52 in accordance with the present invention. Connector 52 preferably comprises a pair of longitudinal electrical conductors 156 and 158 disposed within a connector body 154 made of an electrically insulating material, preferably a thermoplastic material. Connector 52 is designed for carrying high electrical current between a low pressure compartment 32 and a high pressure compartment 162 in a downhole drilling or logging tool. The preferred embodiment shown is for connecting the two leads of a loop antenna 14 in compartment 162 to respective tuning capacitor leads 42 in compartment 32. In a typical tool, compartment 162 is exposed to the high ambient borehole pressure, but compartment 32 is sealed off from the borehole environment so that the tuning capacitors remain at atmospheric pressure instead of being exposed to the high borehole pressure. A typical antenna 14 comprises flat copper strips about 1 inch wide and about 0.030 inch thick. The major portion of antenna 14 is mounted on the external surface of a drill collar 10, and antenna 14 is fed into an interior tuning capacitor compartment 32 using feed-through connector 52.

Figure 2:
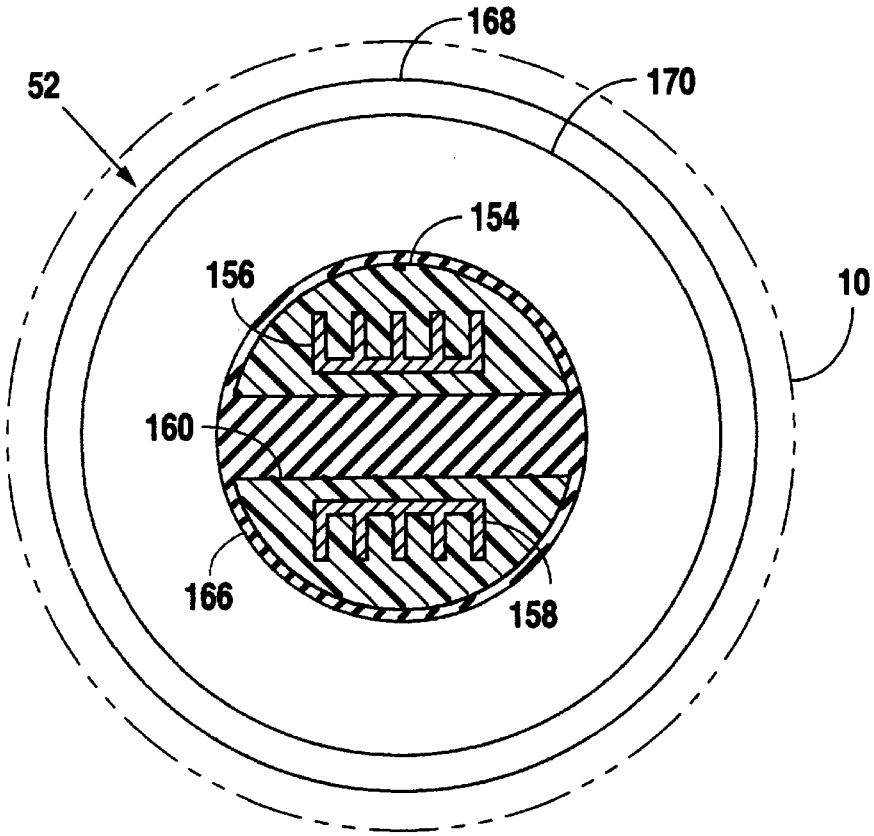
FIG. 2 is a schematic cross-sectional view taken in direction 2—2 of FIG. 1 showing a multi-finned cross-section for the electrical conductors of a connector in accordance with the present invention.
Figure 6:
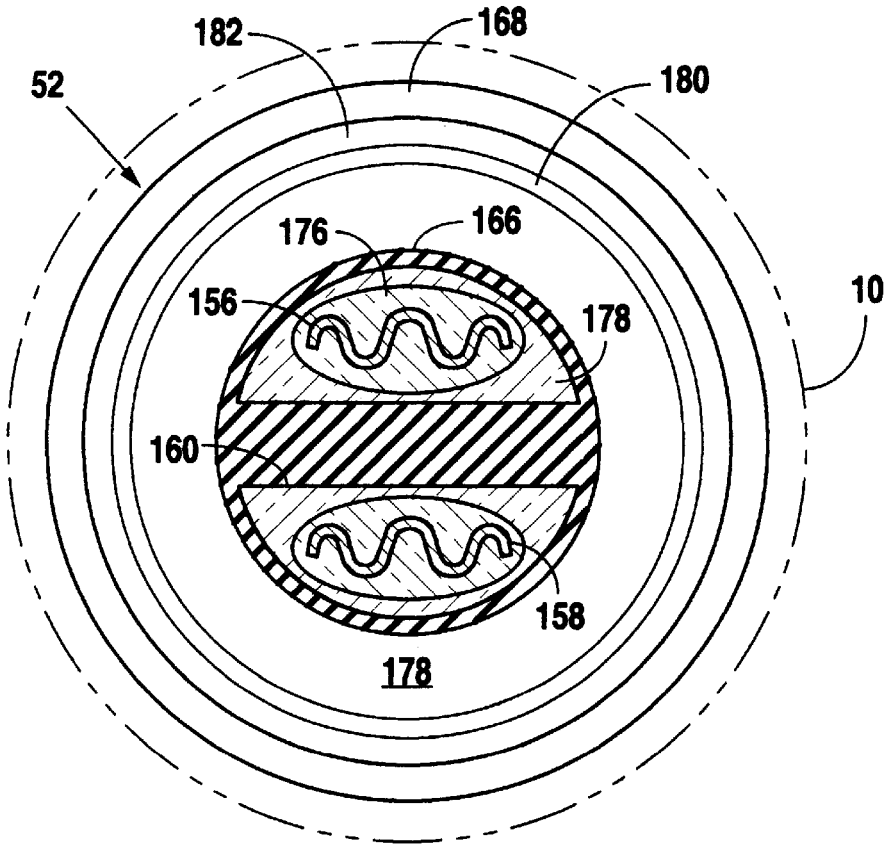
FIG. 6 is a schematic cross-sectional view taken in direction 6—6 of FIG. 5 showing a preferred cross-section of the electrical conductors of a connector in accordance with the present invention.

Referring to FIG. 6, conductors 156 and 158 preferably have a corrugated or wave-like cross-section to minimize the cross-sectional area required for connector 52 and thereby minimize the force acting on connector 52 due to the high differential pressure between compartments 162 and 32. As shown in FIG. 6, the crests and troughs of the wave-like cross-sections of conductors 156 and 158 are preferably aligned "in phase" in order to maximize the distance between conductors 156 and 158. Alternatively, conductors 156 and 158 may have a multi-finned cross-section as shown in FIG. 2. Indeed, many other suitable cross-sectional shapes of conductors 156 and 158 could be formed in accordance with the spirit of the present invention, with the understanding that a primary objective is to provide a sufficient cross-sectional area for conductors 156 and 158 to accommodate the necessary level of electrical current yet minimize the overall cross-sectional area of connector 52 exposed to the high pressure. Concomitantly, it is also desirable to minimize the width of conductors 156, 158 as they enter body 154 on the high pressure (compartment 162) end because that is an important factor in determining the overall diameter of the cross-sectional area of connector 52 exposed to the high pressure. The foregoing consideration concerning the selection of a desirable cross-sectional shape for conductors 156 and 158 must be balanced against another objective, namely, to make the impedance of conductors 156, 158 as low as possible. Another design objective for conductors 156, 158 is to provide them with as much surface area as possible because electrical current generally tends to flow in the outer portions of electrical conductors for high frequency AC electrical signals, which is the primary intended use of a connector in accordance with the present invention. For DC electrical signals and low frequency AC signals, the current generally travels uniformly throughout the conductor cross-section; however, as the frequency of AC signals increases, the more the current tends to migrate toward the exterior surface of the conductor. Moreover, an additional benefit of increased surface area for conductors 156, 158 is to provide more bonding area between conductors 156, 158 and connector body 154.

Figure 3:
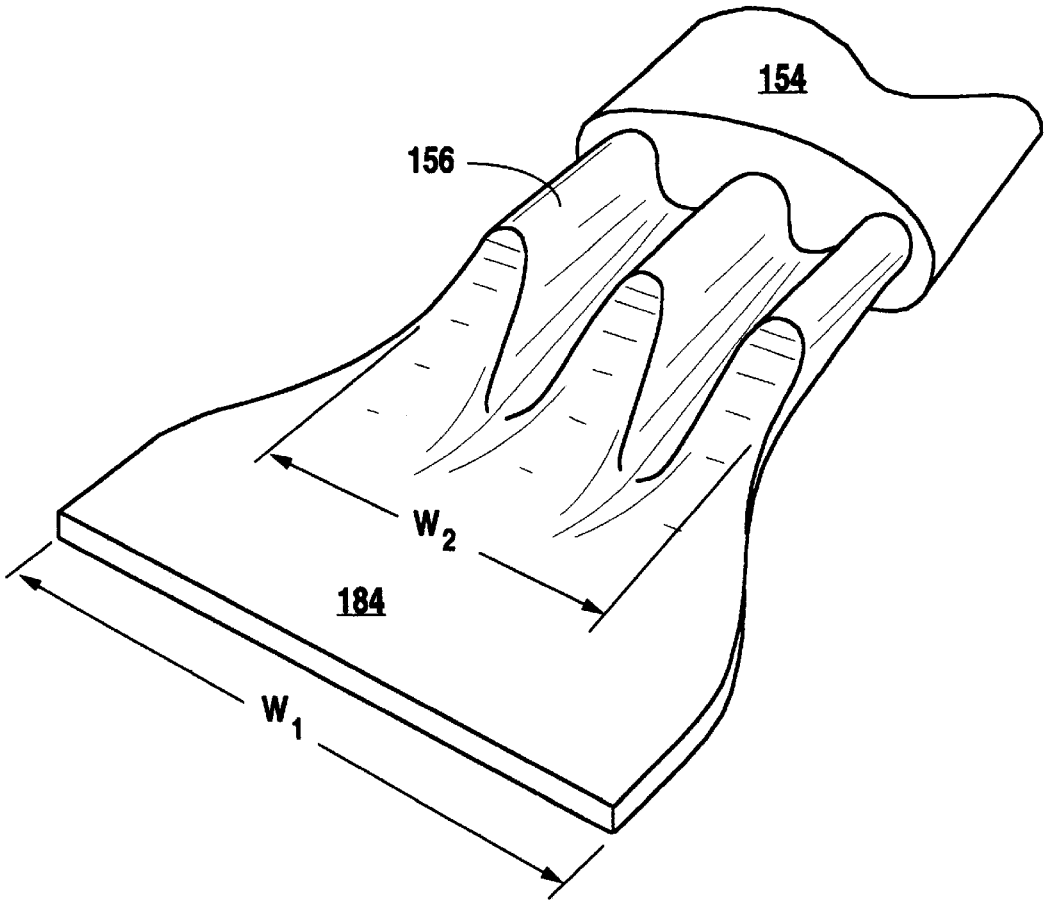
FIG. 3 is a perspective view of an end portion of a preferred electrical conductor for a connector in accordance with the present invention.
Figure 4:
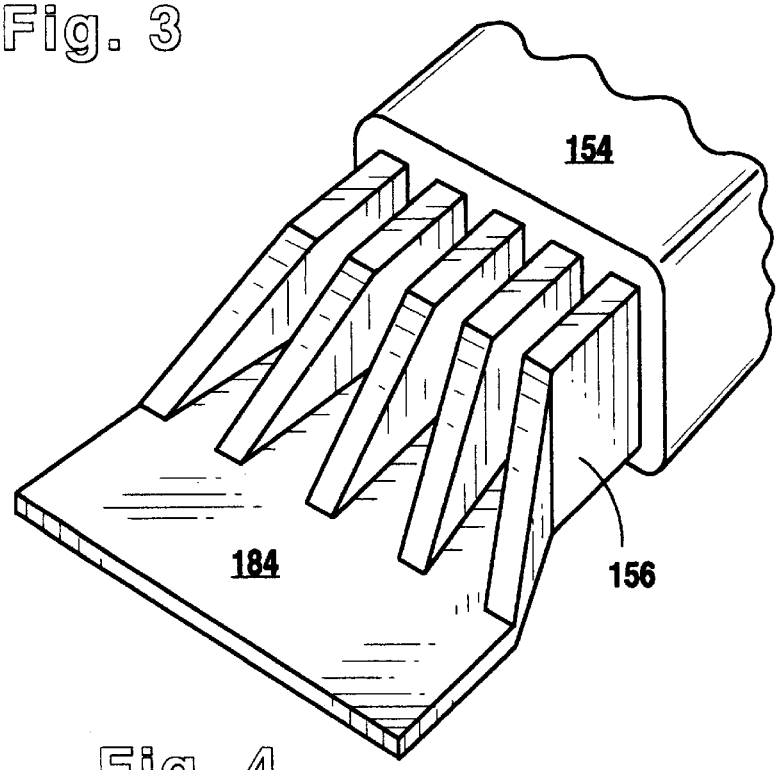
FIG. 4 is a perspective view of an end portion of an alternative electrical conductor for a connector in accordance with the present invention.
Figure 7:
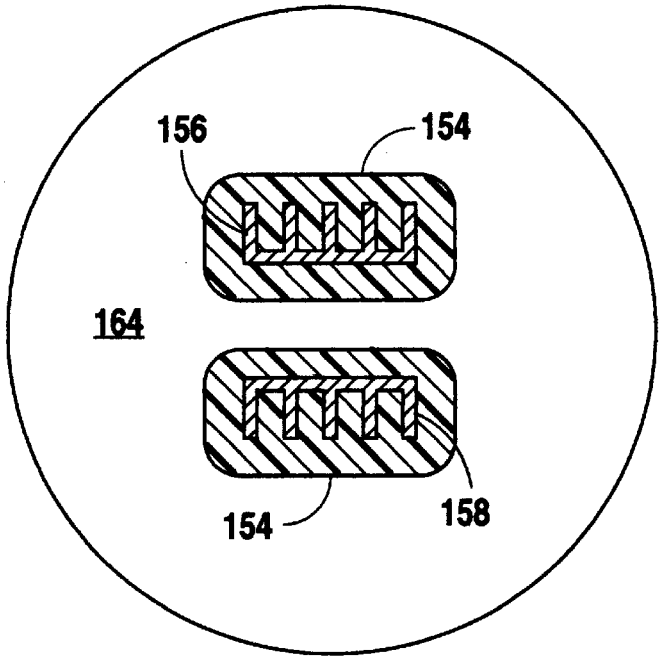
FIG. 7 is a schematic cross-sectional view taken in direction 7—7 of FIG. 1 showing a back plate of the electrical connector of FIG. 1.

Because a typical antenna has a flat cross-section, as mentioned above, conductors 156 and 158 must provide a suitable transition between the flat cross-section of the antenna and the wave-like, multi-finned, or other suitable cross-section of conductors 156 and 158. Thus, for wave-like conductors 156, 158, each end of the conductors preferably comprises a transition portion 184 as best shown in FIG. 3. A similar transition portion 184 for a multi-finned conductor is shown in FIG. 4. For a connector body 154 manufactured using an injection molding process, transition portion 184 may be an integral part of conductors 156, 158 by making conductors 156, 158 from a flat strip of metal, preferably copper or a copper alloy, having a width $W_1$ equal to that of the antenna and pressing the middle portion of the strip into a mold having the desired wave-like shape of width $W_2$ (see FIG. 3). For example, widths $W_1$ and $W_2$ could be 1.0 inch and 0.38 inch, respectively. However, because a preferred connector 52 having an injection molded body 154 preferably comprises a backing plate 164, as shown in FIGS. 1 and 7 and discussed in more detail below, having openings through which conductors 156 and 158 closely fit on the low pressure (compartment 32) end of connector 52, the transition portions 184 on the low pressure ends of conductors 156 and 158 are preferably connected to conductors 156 and 158 using a suitable fastening technique, such as welding, after backing plate 164 is installed onto connector 52. The same concept also applies to an alternative embodiment shown in FIG. 5 which has a metal housing 182 having openings through which conductors 156 and 158 closely fit on the low pressure end of connector 52.

Referring again to FIG. 1, connector 52 preferably comprises a back plate 164 having openings through which extensions of connector body 154 and conductors 156, 158 protrude (also illustrated in FIG. 7). Back plate 164 bears on an interior surface of tool 10 and prevents the high differential pressure from extruding body 154 through the opening between compartment 162 and compartment 32. For additional protection against such extrusion tendencies, conductors 156 and 158 may be provided with one or more transverse holes 156A, 158A such that the material of body 154 (which is preferably an injection molded thermoplastic) flows through transverse holes 156A, 158A during the injection molding process and thereby enhances the bond between conductors 156, 158 and body 154. A similar effect could also be achieved with notches in the edges of conductors 156, 158. Holes 156A, 158A and backing plate 164 also help to prevent the effects of creep in the material of body 154 due to elevated temperatures and high stresses. Holes 156A, 158A may be placed in any convenient portion of conductors 156, 158 that will be disposed within body 154. For example, for wave-like conductors 156, 158 manufactured using a stamping and forming process, holes 156A, 158A could be stamped into conductors 156, 158 at convenient locations. Alternatively, for multi-finned conductors 156, 158 manufactured using a machining process, holes 156A, 158A could be machined into conductors 156, 158 at desirable locations.

Still referring to FIG. 1, to reduce the overall force on connector 52 due to the high differential pressure between compartment 162 and compartment 32, connector 52 preferably has a portion 52A of reduced cross-section on the high pressure (compartment 162) end. A filler 170 is used to fill the remaining cross-sectional area around connector 52 on the high pressure end. To form the necessary pressure seal, filler 170 preferably has interior and exterior slots 174 and 188 for receiving O-rings 172 and 186, respectively. Filler 170 and connector 52 are preferably held in place by a retaining ring 168 which fits inside a corresponding slot in tool 10; however, any suitable fastening means may be used to perform this function. Conductors 156 and 158 should be separated by a sufficient distance D to prevent arcing between conductors 156 and 158. To provide additional protection against such arcing, connector body 154 preferably has a slot 160 to create a more tortuous path between conductors 156 and 158 along the surface of body 154. Finally, a molded rubber boot 166 or other suitable encapsulant is preferably bonded to body 154 over conductors 156, 158 on the high pressure end of connector 52 to seal off conductors 156, 158 from the borehole fluids. The foregoing apparatus thus provides a hermetically sealed electrical connection between the antenna 14 in compartment 162 and the capacitor leads 42 in compartment 32.

Figure 5:
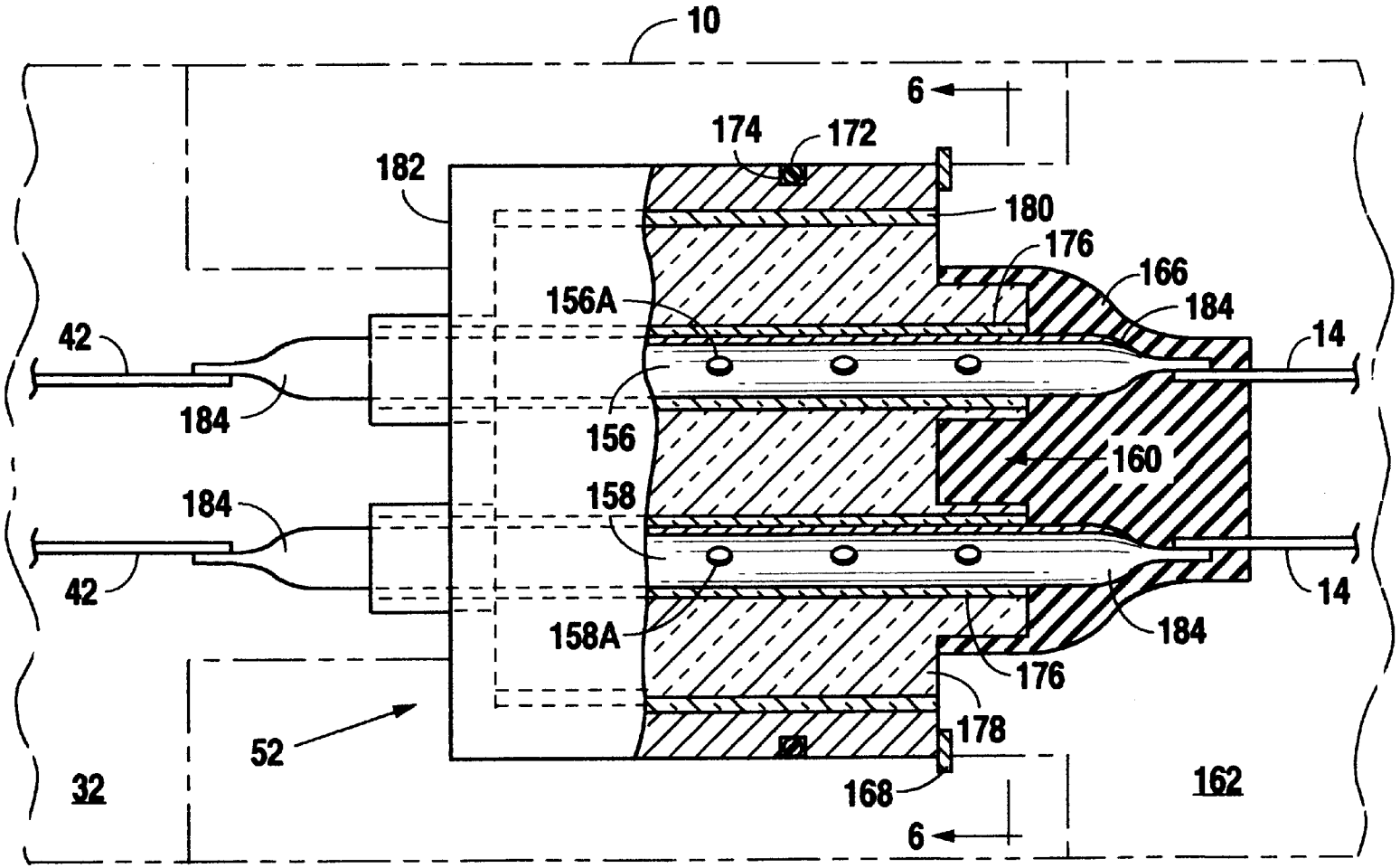
FIG. 5 is a schematic side elevational partially cross-sectioned view of an alternative electrical connector in accordance with the present invention.

Referring to FIGS. 5 and 6, an alternative embodiment of connector 52 comprises metal (preferably copper or copper alloy) conductors 156, 158 disposed within glass sheaths 176, which form a glass-to-metal seal between conductors 156, 158 and sheaths 176. To provide additional insulation, sheaths 176 are preferably bonded within a ceramic body 178, which is bonded inside a cup-shaped metal housing 182 with a glass layer 180. Conductors 156 and 158, sheaths 176, and surrounding portions of body 178 protrude through close-fitting openings in the end of housing 182 similar to the openings in back plate 164 mentioned above for the preferred embodiment shown in FIGS. 1, 2 and 7. Similar to the above-described preferred embodiment, this alternative embodiment comprises a slot 160 in body 178 to help prevent arcing between conductors 156 and 158 and an encapsulating boot 166 to seal off conductors 156, 158 from the borehole fluids in compartment 162. This alternative embodiment is preferably sealed to drill collar 10 by an O-ring 172 seated in a slot 174 about the circumference of housing 182, and the apparatus is preferably held in place with a retaining ring 168, as discussed above. Although the alternative embodiment shown in FIG. 5 does not include a filler 170 as in the preferred embodiment shown in FIG. 1, such a filler may be used in conjunction with this alternative embodiment, if desired, to reduce the cross-sectional area exposed to the high pressure of compartment 162. The glass-to-metal seals of this alternative embodiment do not tend to creep as readily as the thermoplastic bonds of the preferred embodiment discussed above.

As discussed above with regard to FIG. 1, one of the advantages of providing a transition portion 184 for conductors 156, 158 outside body 154 is compactness, which provides a reduced cross-sectional area on the high pressure end to thereby reduce the overall force acting on connector 52 due to the differential pressure between compartments 162 and 32. However, if compactness is not an overriding concern for a particular application of this invention, the transition portion 184 may be disposed within body 154. Although such an embodiment would not retain the benefit of a reduced overall force on connector 52, such an embodiment would achieve the advantage of reducing the force acting on conductors 156, 158 by reducing the cross-sectional area of conductors 156, 158 which is exposed to the high pressure. Such an embodiment would also retain the benefit of enhanced bonding between conductors 156, 158 and body 154 due to increased surface area of conductors 156, 158 and holes 156A, 158A. Thus, such a configuration would help reduce the possibility of extruding conductors 156, 158 through body 154.

Although the preferred embodiment illustrated herein comprises two conductors for use with the two ends of a loop antenna, other desirable configurations may comprise only one conductor or more than two conductors, depending on the particular application. Additionally, although the embodiments described herein are of circular overall cross-section, other overall cross-sectional shapes may be utilized to advantage. Furthermore, depending on the various requirements of a particular application, some of the objectives of this invention may be achieved using conductors 156, 158 having a conventional, flat cross-sectional shape.

Figure 8:
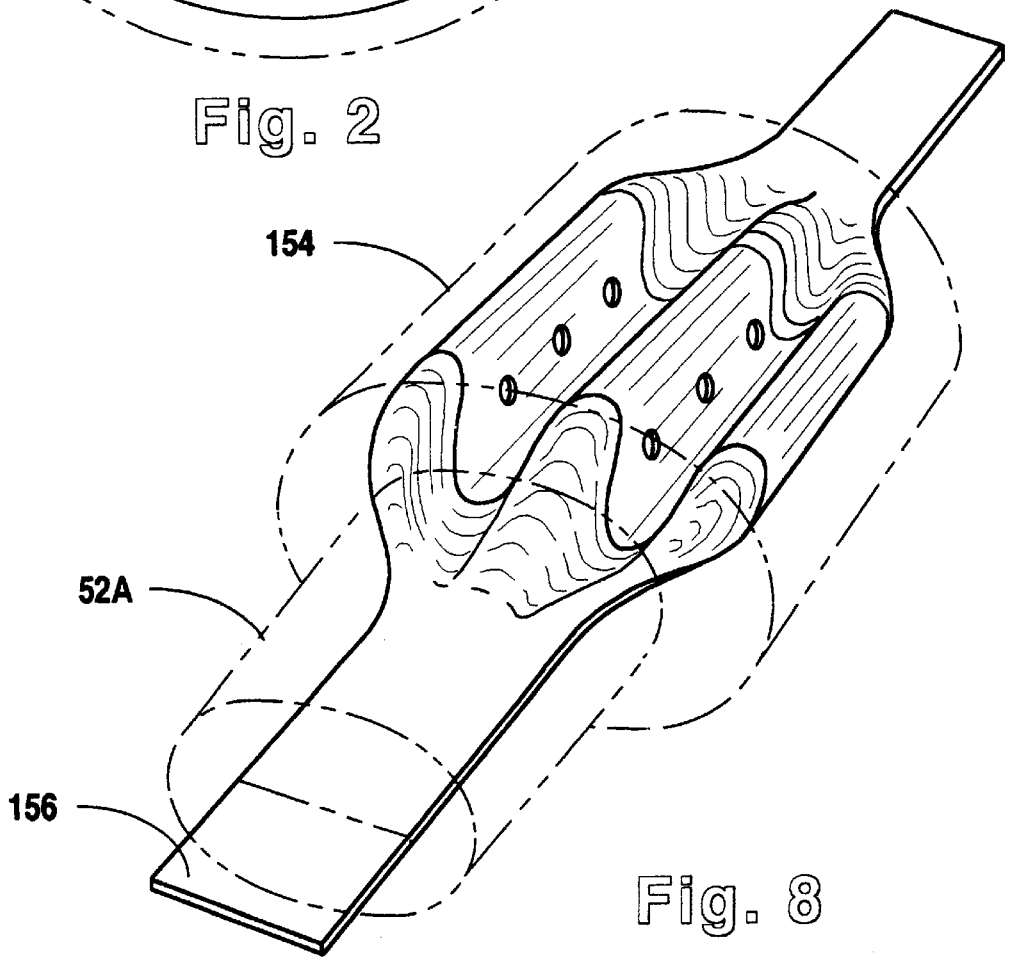
FIG. 8 is a perspective view showing an alternative embodiment of a connector in accordance with the present invention.

For example, referring to FIG. 8, conductors 156, 158 may start with a relatively narrow, flat cross-sectional shape as they enter body 154 on the high pressure end, and traverse through portion 52A of reduced cross-section transition into a wider, corrugated cross-sectional shape in the interior of a portion of body 154 having a larger diameter, and then narrow back down to a flat shape before exiting body 154 on the low pressure end.

Thus, although the foregoing specific details describe a preferred embodiment of this invention, persons reasonably skilled in the art of electrical power transmission in petroleum well drilling and logging tools will recognize that various changes may be made in the details of the apparatus of this invention without departing from the spirit and scope of the invention as defined in the appended claims. Therefore, it should be understood that this invention is not to be limited to the specific details shown and described herein.

I claim:

1. An apparatus for carrying electrical current in a downhole tool between a first compartment having a relatively high pressure and a second compartment having a relatively low pressure, said first and second compartments being separated by a structure having an opening for receiving said apparatus, comprising:

an electrically insulting body capable of being inserted into said opening, said body having a first end for exposure to said relatively high pressure and a second end for exposure to said relatively low pressure;

a pressure seal for sealing said body between said first and second compartments; and at least one conductor comprising an electrically conductive material traversing through said body between said first end and said second end, said at least one conductor being sealably bonded to said body and having a cross-sectional shape designed to minimize the cross-sectional area of said first end of said body and maximize the surface area of said at least one conductor.

2. The apparatus of claim 1 wherein said cross-sectional shape of said at least one conductor is wave-like.

3. The apparatus of claim 1 wherein said cross-sectional shape of said at least one conductor comprises a plurality of fins.

4. The apparatus of claim 1 wherein said cross-sectional shape of said at least one conductor is flat.

5. The apparatus of claim 1 wherein said body comprises a thermoplastic material.

6. The apparatus of claim 1 further comprising a back plate disposed on said second end of said body and having at least one opening, wherein said at least one conductor passes through said at least one opening of said back plate.

7. The apparatus of claim 6 wherein a portion of said body surrounding said at least one conductor passes through said at least one opening of said back plate.

8. The apparatus of claim 1 wherein said at least one conductor has at least one transverse hole in which a portion of the material of said body is disposed.

9. The apparatus of claim 1 wherein said at least one conductor has at least one notch in which a portion of the material of said body is disposed.

10. The apparatus of claim 1 further comprising a boot surrounding said at least one conductor on said first end of said body, said boot being sealably bonded to said body and said at least one conductor.

11. The apparatus of claim 1 further comprising a boot surrounding said at least one conductor on said second end of said body, said boot being sealably bonded to said body and said at least one conductor.

12. The apparatus of any one of claims 10 and 11 wherein said boot comprises a rubber material.

13. The apparatus of claim 1 wherein said at least one conductor comprises a transition portion having a first end with a first cross-sectional shape and a second end with a second cross-sectional shape, said second cross-sectional shape being different from said first cross-sectional shape.

14. The apparatus of claim 1 wherein said pressure seal comprises a filler element disposed about said body, a first O-ring between said body and said filler element, and a second O-ring disposed about said filler element for forming a seal between said filler element and said structure.

15. The apparatus of claim 14 further comprising a retaining ring to hold said filler element in place with respect to said structure.

16. The apparatus of claim 1 wherein said at least one conductor comprises two such conductors spaced apart from each other and wherein said body comprises a slot between said two conductors to prevent electrical arcing between said two conductors.

17. The apparatus of claim 16 wherein said two conductors are substantially parallel.

18. The apparatus of claim 16 wherein said two conductors have the same cross-sectional shape.

19. An apparatus for carrying electrical current in a downhole tool between a first compartment having a relatively high pressure and a second compartment having a relatively low pressure, said first and second compartments being separated by a structure having an opening for receiving said apparatus, comprising:

a metal housing capable of being inserted into said opening;

an electrically insulating body having a first end for exposure to said relatively high pressure and a second end for exposure to said relatively low pressure, said body being disposed within and sealably bonded to said housing with a layer of glass;

at least one conductor comprising an electrically conductive material traversing through said body between said first end and said second end, said at least one conductor being sealably bonded to said body with at least one sheath of glass; and a pressure seal for sealing said housing between said first and second compartments;

wherein said at least one conductor has a cross-sectional shape designed to minimize the cross-sectional area of said first end of said body and maximize the surface area of said at least one conductor.

20. The apparatus of claim 19 wherein said cross-sectional shape of said at least one conductor is wave-like.

21. The apparatus of claim 19 wherein said cross-sectional shape of said at least one conductor comprises a plurality of fins.

22. The apparatus of claim 19 wherein said cross-sectional shape of said at least one conductor is flat.

23. The apparatus of claim 19 wherein said body comprises a ceramic material.

24. The apparatus of claim 19 wherein said housing further comprises a back plate disposed on said second end of said body and having at least one opening, wherein said at least one conductor passes through said at least one opening of said back plate.

25. The apparatus of claim 24 wherein a portion of said body surrounding said at least one conductor passes through said at least one opening of said back plate.

26. The apparatus of claim 19 wherein said at least one conductor has at least one transverse hole in which a portion of the material of said body is disposed.

27. The apparatus of claim 19 wherein said at least one conductor has at least one notch in which a portion of the material of said body is disposed.

28. The apparatus of claim 19 further comprising a boot surrounding said at least one conductor on said first end of said body, said boot being sealably bonded to said body and said at least one conductor.

29. The apparatus of claim 19 further comprising a boot surrounding said at least one conductor on said second end of said body, said boot being sealably bonded to said body and said at least one conductor.

30. The apparatus of any one of claims 28 and 29 wherein said boot comprises a rubber material.

31. The apparatus of claim 19 wherein said at least one conductor comprises a transition portion having a first end with a first cross-sectional shape and a second end with a second cross-sectional shape, said second cross-sectional shape being different from said first cross-sectional shape.

32. The apparatus of claim 19 wherein said pressure seal comprises an O-ring disposed about said housing for forming a seal between said housing and said structure.

33. The apparatus of claim 32 further comprising a retaining ring to hold said housing in place with respect to said structure.

34. The apparatus of claim 19 wherein said at least one conductor comprises two such conductors spaced apart from each other and wherein said body comprises a slot between said two conductors to prevent electrical arcing between said two conductors.

35. The apparatus of claim 34 wherein said two conductors are substantially parallel.

36. The apparatus of claim 34 wherein said two conductors have the same cross-sectional shape.

37. An electrical connector comprising:

an electrically insulating body having a first end and a second end; and at least one conductor comprising an electrically conductive material traversing through said body between said first end and said second end, said at least one conductor being sealably bonded to said body and having a cross-sectional shape designed to minimize the cross-sectional area of said first end of said body and maximize the surface area of said at least one conductor.

38. The electrical connector of claim 37 wherein said cross-sectional shape of said at least one conductor is wave-like.

39. The electrical connector of claim 37 wherein said cross-sectional shape of said at least one conductor comprises a plurality of fins.

40. The electrical connector of claim 37 wherein said cross-sectional shape of said at least one conductor is flat 41. The electrical connector of claim 37 wherein said body comprises a thermoplastic material.

42. The electrical connector of claim 37 further comprising a back plate disposed on said second end of said body and having at least one opening, wherein said at least one conductor passes through said at least one opening of said back plate.

43. The electrical connector of claim 42 wherein a portion of said body surrounding said at least one conductor passes through said at least one opening of said back plate.

44. The electrical connector of claim 37 wherein said at least one conductor has at least one transverse hole in which a portion of the material of said body is disposed.

45. The electrical connector of claim 37 wherein said at least one conductor has at least one notch in which a portion of the material of said body is disposed.

46. The electrical connector of claim 37 further comprising a boot surrounding said at least one conductor on said first end of said body, said boot being sealably bonded to said body and said at least one conductor.

47. The electrical connector of claim 37 further comprising a boot surrounding said at least one conductor on said second end of said body, said boot being sealably bonded to said body and said at least one conductor.

48. The electrical connector of any one of claims 46 and 47 wherein said boot comprises a rubber material.

49. The electrical connector of claim 37 wherein said at least one conductor comprises a transition portion having a first end with a first cross-sectional shape and a second end with a second cross-sectional shape, said second cross-sectional shape being different from said first cross-sectional shape.

50. The electrical connector of claim 37 further comprising a pressure seal for sealing said electrical connector in a barrier structure having an opening for receiving said electrical connector.

51. The electrical connector of claim 50 wherein said pressure seal comprises a filler element disposed about said body, a first O-ring between said body and said filler element, and a second O-ring disposed about said filler element for forming a seal between said filler element and said barrier structure.

52. The electrical connector of claim 51 further comprising a retaining ring to hold said filler element in place with respect to said barrier structure.

53. The electrical connector of claim 37 wherein said at least one conductor comprises two such conductors spaced apart from each other and wherein said body comprises a slot between said two conductors to prevent electrical arcing between said two conductors.

54. The electrical connector of claim 53 wherein said two conductors are substantially parallel.

55. The electrical connector of claim 53 wherein said two conductors have the same cross-sectional shape.

56. An electrical connector comprising:

a metal housing;

an electrically insulating body having a first end and a second end, said body being disposed within and sealably bonded to said housing with a layer of glass; and at least one conductor comprising an electrically conductive material traversing through said body between said first end and said second end, said at least one conductor being sealably bonded to said body with at least one sheath of glass;

wherein said at least one conductor has a cross-sectional shape designed to minimize the cross-sectional area of said first end of said body and maximize the surface area of said at least one conductor.

57. The electrical connector of claim 56 wherein said cross-sectional shape of said at least one conductor is wave-like.

58. The electrical connector of claim 56 wherein said cross-sectional shape of said at least one conductor comprises a plurality of fins.

59. The electrical connector of claim 56 wherein said cross-sectional shape of said at least one conductor is flat.

60. The electrical connector of claim 56 wherein said body comprises a ceramic material.

61. The electrical connector of claim 56 wherein said housing further comprises a back plate disposed on said second end of said body and having at least one opening, wherein said at least one conductor passes through said at least one opening of said back plate.

62. The electrical connector of claim 61 wherein a portion of said body surrounding said at least one conductor passes through said at least one opening of said back plate.

63. The electrical connector of claim 56 wherein said at least one conductor has at least one transverse hole in which a portion of the material of said body is disposed.

64. The electrical connector of claim 56 wherein said at least one conductor has at least one notch in which a portion of the material of said body is disposed.

65. The electrical connector of claim 56 further comprising a boot surrounding said at least one conductor on said first end of said body, said boot being sealably bonded to said body and said at least one conductor.

66. The electrical connector of claim 56 further comprising a boot surrounding said at least one conductor on said second end of said body, said boot being sealably bonded to said body and said at least one conductor.

67. The electrical connector of any one of claims 65 and 66 wherein said boot comprises a rubber material.

68. The electrical connector of claim 56 wherein said at least one conductor comprises a transition portion having a first end with a first cross-sectional shape and a second end with a second cross-sectional shape, said second cross-sectional shape being different from said first cross-sectional shape.

69. The electrical connector of claim 56 further comprising a pressure seal for sealing said electrical connector in a barrier structure having an opening for receiving said electrical connector.

70. The electrical connector of claim 69 wherein said pressure seal comprises an O-ring disposed between said housing and said barrier structure.

71. The electrical connector of claim 70 further comprising a retaining ring to hold said housing in place with respect to said barrier structure.

72. The electrical connector of claim 56 wherein said at least one conductor comprises two such conductors spaced apart from each other and wherein said body comprises a slot between said two conductors to prevent electrical arcing between said two conductors.

73. The electrical connector of claim 72 wherein said two conductors are substantially parallel.

74. The electrical connector of claim 72 wherein said two conductors have the same cross-sectional shape.

* * * * *